(12) United States Patent
Parsche

(10) Patent No.: US 11,327,141 B2
(45) Date of Patent: May 10, 2022

(54) LORAN DEVICE WITH ELECTRICALLY SHORT ANTENNA AND CRYSTAL RESONATOR AND RELATED METHODS

(71) Applicant: EAGLE TECHNOLOGY, LLC, Melbourne, FL (US)

(72) Inventor: Francis E. Parsche, Palm Bay, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 336 days.

(21) Appl. No.: 16/374,069

(22) Filed: Apr. 3, 2019

(65) Prior Publication Data

US 2020/0319286 A1    Oct. 8, 2020

(51) Int. Cl.
*G01S 1/24* (2006.01)
*H01Q 5/10* (2015.01)
*G01S 1/04* (2006.01)

(52) U.S. Cl.
CPC ............. *G01S 1/24* (2013.01); *G01S 1/045* (2013.01); *H01Q 5/10* (2015.01)

(58) Field of Classification Search
CPC ............ G01S 1/245; G01S 1/24; G01S 1/045; H01Q 5/10; H01Q 9/00–46
See application file for complete search history.

(56) References Cited

U.S. PATENT DOCUMENTS

| | | |
|---|---|---|
| 2,133,644 A | 10/1938 | Pierce |
| 2,812,427 A | 11/1957 | Leo |
| 3,518,550 A | 6/1970 | Boubouleix et al. |
| 3,947,849 A | 3/1976 | Fehlner et al. |
| 4,019,183 A | 4/1977 | Haynes |
| 4,134,117 A | 1/1979 | Robinson et al. |
| 4,166,275 A | 8/1979 | Michaels et al. |
| 4,268,830 A | 5/1981 | Brodeur |
| 4,300,139 A | 11/1981 | Wurst et al. |
| 4,318,105 A | 3/1982 | Brodeur |
| 4,325,067 A | 4/1982 | Brodeur |
| RE31,254 E | 5/1983 | Brodeur |
| RE31,962 E | 7/1985 | Brodeur |
| 4,591,860 A | 5/1986 | Fukuhara |
| 4,631,543 A | 12/1986 | Brodeur |
| 4,804,964 A | 2/1989 | Takai et al. |
| 4,814,771 A | 3/1989 | Bahr et al. |
| 4,888,594 A * | 12/1989 | Sundquist ............... G01S 1/245 342/389 |

(Continued)

OTHER PUBLICATIONS

Nan et al. "Acoustically actuated ultra-compact NEMS magnetoelectric antennas" Nature Communications 8: 296 https://www.nature.com/articles/s41467-017-00343-8: pp. 8.

(Continued)

*Primary Examiner* — Cassi J Galt
(74) *Attorney, Agent, or Firm* — Allen, Dyer, Doppelt + Gilchrist, P.A.

(57) ABSTRACT

A LORAN device may include a housing, and an electrically short LORAN antenna carried by the housing. The LORAN device may have a LORAN receiver carried by the housing and coupled to the electrically short LORAN antenna, and an RF crystal resonator coupled to the electrically short LORAN antenna so that the electrically short LORAN antenna is forced to a resonant condition for a LORAN receive signal.

17 Claims, 8 Drawing Sheets

(56) References Cited

U.S. PATENT DOCUMENTS

| | | | |
|---|---|---|---|
| 4,999,638 | A | 3/1991 | Schick |
| 5,032,845 | A | 7/1991 | Velasco |
| 5,099,249 | A * | 3/1992 | Seavey ................ H01Q 1/3275 |
| | | | 343/700 MS |
| 5,220,333 | A | 6/1993 | Penrod |
| 6,873,300 | B2 | 3/2005 | Mendenhall |
| 7,719,928 | B2 | 5/2010 | Meltzer et al. |
| 7,788,979 | B2 | 9/2010 | Vetelino et al. |
| 8,026,860 | B2 * | 9/2011 | Mayes .................... H01Q 9/16 |
| | | | 343/810 |
| 8,164,529 | B2 | 4/2012 | Parsche et al. |
| 8,659,480 | B2 | 2/2014 | Wilkins |
| 8,724,214 | B2 | 5/2014 | Schut et al. |
| 8,736,782 | B2 | 5/2014 | Chen et al. |
| 9,553,364 | B2 | 1/2017 | Williams |
| 2009/0152364 | A1 | 6/2009 | Spivey, Jr. |
| 2010/0309061 | A1 | 12/2010 | Sinha |
| 2014/0266939 | A1 | 9/2014 | Baringer et al. |
| 2016/0036119 | A1 | 2/2016 | Baringer |
| 2017/0160370 | A1 * | 6/2017 | Yakubisin ............... G01S 1/245 |
| 2017/0192102 | A1 * | 7/2017 | Wietfeldt .................. G01S 5/10 |
| 2018/0198211 | A1 | 7/2018 | Wall et al. |
| 2018/0226720 | A1 | 8/2018 | Wall et al. |

OTHER PUBLICATIONS

Frederick Terman, "Radio Engineer's Handbook" McGraw-Hill Book Company, Inc, 1943; pp. 75.

Chu, L.J. "Physical Limitations of Omni-Directional Antennas" (Dec. 1948), Journal of Applied Physics 19: Abstract Only.

U.S. Appl. No. 15/980,857, filed May 16, 2018 Parshe et al.

U.S. Appl. No. 16/419,568, filed May 22, 2018 Francis E. Parshe.

* cited by examiner

LORAN DEVICE WITH ELECTRICALLY SHORT ANTENNA AND CRYSTAL RESONATOR AND RELATED METHODS

TECHNICAL FIELD

The present disclosure relates to the field of communication systems, and, more particularly, to radio frequency antennas and related methods.

BACKGROUND

For radio frequency (RF) communications in the very low frequency (VLF), low frequency (LF), and medium frequency (MF) ranges, for example, relatively large ground-based antenna towers are used for transmitting such signals. Such antenna configurations may include a tower several hundred feet in height connected to the ground at its base, with numerous guy wires connecting the tower to ground for stability.

One example medium wave antenna system is disclosed in U.S. Pat. No. 6,873,300 to Mendenhall. This patent discloses an antenna system including an electrically conductive radiating mast that extends generally vertical relative to earth ground. The mast has a lower end for receiving RF energy for radiation thereby at an operating RF frequency, and an upper end. A plurality of N radial, electrically conductive, wires is provided with each having an inner end and an outer end. The inner ends of the radial wires are electrically connected together and located proximate to the vertical mast. The radial wires are elevated throughout their lengths above the level of earth ground and extend radially outward from the vertical mast. A tuning device, such as an adjustable inductor, is connected to the radial wires for adjusting the impedance thereof such that the radial wires resonate at the operating frequency.

Another example where large scale tower based antennas are used is low frequency transmission stations for navigation systems, such as the LOng RAnge Navigation (LO-RAN) system. LORAN was developed in the United States during World War II. Subsequent implementations provided for enhancements in accuracy and usefulness, including LORAN-C and the later enhanced LORAN (eLORAN) implementations. More particularly, eLORAN is a low frequency radio navigation system that operates in the frequency band of 90 to 110 kHz. Low frequency eLORAN transmissions can propagate by ground wave, a type of surface wave that hugs the earth. Ionospheric reflections or sky waves are another significant mechanism of eLORAN wave propagation. With typical low frequency antennas, the tower itself is used as a monopole antenna. Because of the height of the tower, which may be 600 feet or more as a result of the operating wavelength, many upper wires connect to the tower top forming a resonating capacitor. These wires, known as top loading elements (TLEs), may approximate a solid cone.

eLORAN may operate at low frequencies, such as 100 kHz, making the transmit antenna physical size large. Yet, in eLORAN, the antenna electrical size is small relative to the wavelength. Physics may limit the electrically small antenna fixed tuned bandwidth. One theory is the Chu Limit as described in the reference "Physical limitations of omnidirectional antennas", Chu, L. J. (December 1948), Journal of Applied Physics 19: 1163-1175, which is called out as a reference herein. The Chu Bandwidth Limit equation may be $Q=1/kr^3$, where Q is a dimensionless number relating to bandwidth, k is the wave number=$2\pi/\lambda$, and r is the radius of a spherical analysis volume enclosing the antenna. In turn, the 3 dB bandwidth of the small antenna in percent is equal to 200/Q. There have been efforts at "active loading inductors" involving feedback to defeat the Chu Limit but such "active loading inductors" involve semiconductor devices causing significant to defeating and efficiency/gain losses. Antenna radiation bandwidth is a matter of considerable importance to eLORAN as it enables sharp eLORAN pulses with fast rise times to be transmitted.

Efficiency and realized gain can be small when an antenna structure is small in size relative wavelength. For an antenna fitting into a sphere of radius $\lambda/2\pi$, a definition of electrically small, the directivity must be between 0 and 1.76 dB. If 100 efficient the realized gain must be between 0 and 1.76 dBi. Most electrically small antennas have a toroidal radiation pattern shape, although there can be exceptions such as the approximately spherical pattern provided of U.S. Pat. No. 8,164,529 to Parsche, assigned to the present application's assignee.

Of course, for the smallest antennas, material losses mean the realized gain will be much lower than the 0 to 1.76 dBi. Nature provides better room temperature insulators than conductors at present, meaning that metals and even copper are ultimately a fundamental limitation to practical small size antenna efficiency. Even superconductors are not a solution as they, the antenna RF currents, cause magnetic fields that expel the RF currents to the surface or choke off current flow entirely.

With the rise of satellite based navigations systems such as the Global Positioning System (GPS), there has been relatively little development or investment in terrestrial-based navigation systems, such as eLORAN, until recently. A renewed interest in such systems has arisen as a backup to satellite navigation systems, particularly since low frequency eLORAN signals are less susceptible to jamming or spoofing compared to the relatively higher frequency GPS signals. As such, further developments in eLORAN antenna systems may be desirable in certain applications.

As noted above, given the operational frequency of eLORAN systems and the typical deployment in land vehicles and watercraft, the design of the eLORAN antenna may present unique design issues. In particular, given the mobile application of the eLORAN antenna, the mobile antenna must be small sized and durable, and with a stable frequency of resonance.

Nevertheless, given the small size of the eLORAN antenna, this makes the antenna intrinsically inefficient as a receiver of these low frequency signals.

SUMMARY

Generally, a LORAN device may include a housing, and an electrically short LORAN antenna carried by the housing. The LORAN device may have a LORAN receiver carried by the housing and coupled to the electrically short LORAN antenna, and at least one RF crystal resonator coupled to the electrically short LORAN antenna so that the electrically short LORAN antenna is forced to a resonant condition for a LORAN receive signal.

In particular, the at least one RF crystal resonator may include at least one quartz crystal resonator. The electrically short LORAN antenna may comprise an electrically floating antenna element.

In some embodiments, the electrically short LORAN antenna may also comprise a dipole antenna having first and second antenna elements. The first antenna element may be electrically floating and the second antenna element may define a ground plane. Additionally, the at least one RF crystal resonator may comprise a first crystal resonator coupled in series with one of the first and second antenna elements and a second crystal resonator coupled in parallel with the first and second antenna elements.

For example, the at least one RF crystal resonator may provide an inductance in a range of 0.25 to 0.75 Henry. The LORAN receiver may comprise an RF amplifier, and LORAN receiver electronics coupled to the RF amplifier. The LORAN device may further comprise a display carried by the housing and coupled to the LORAN receiver. Moreover, in some embodiments, the LORAN device comprises an eLORAN device.

Another aspect is directed to a method for making a LORAN device. The method may include mounting an electrically short LORAN antenna on a housing, mounting a LORAN receiver in the housing and coupled to the electrically short LORAN antenna, and coupling at least one RF crystal resonator to the electrically short LORAN antenna so that the electrically short LORAN antenna is forced to a resonant condition for a LORAN receive signal.

DETAILED DESCRIPTION

Figure 1:
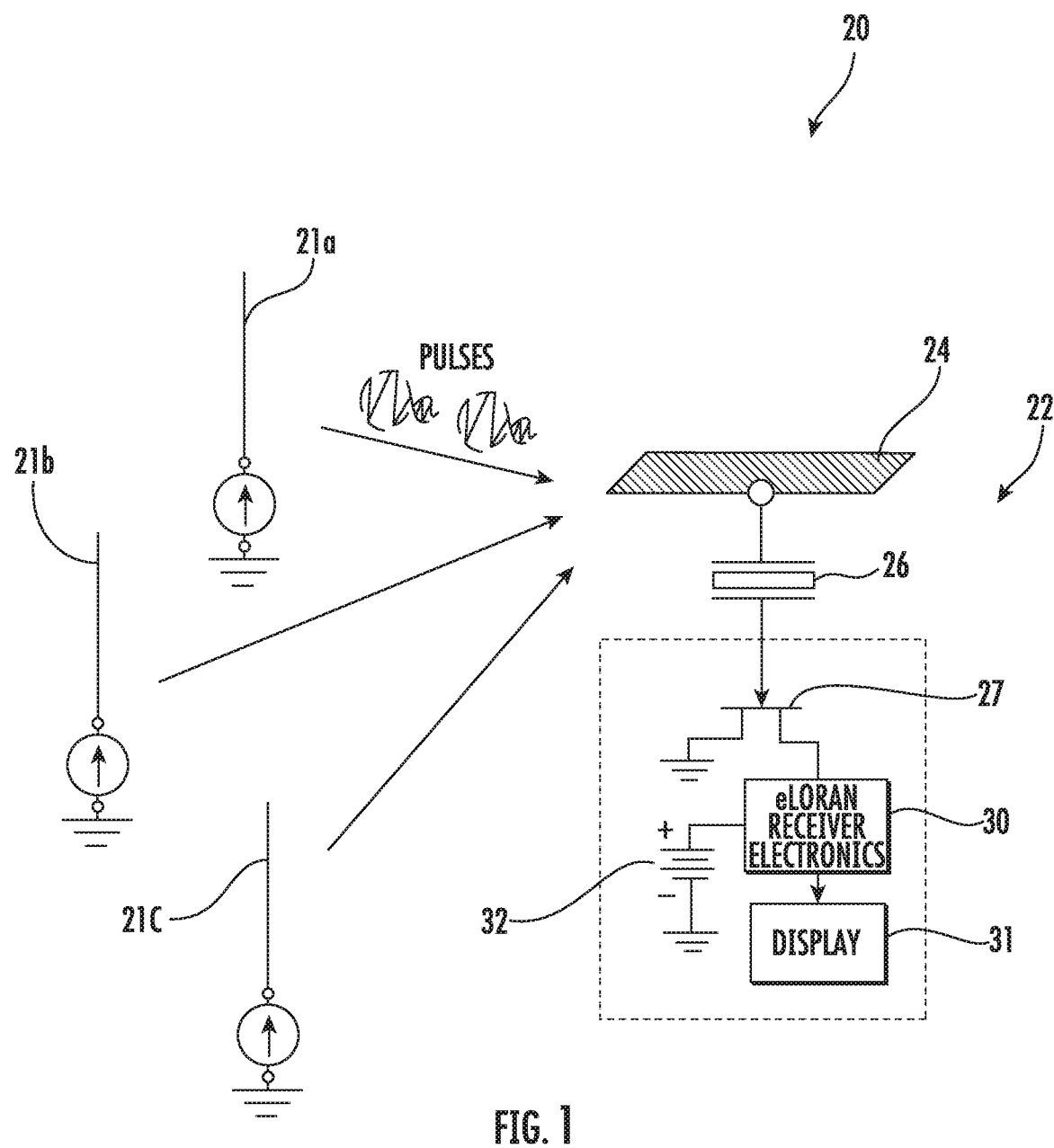
FIG. 1 is a schematic diagram of a LORAN communication system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
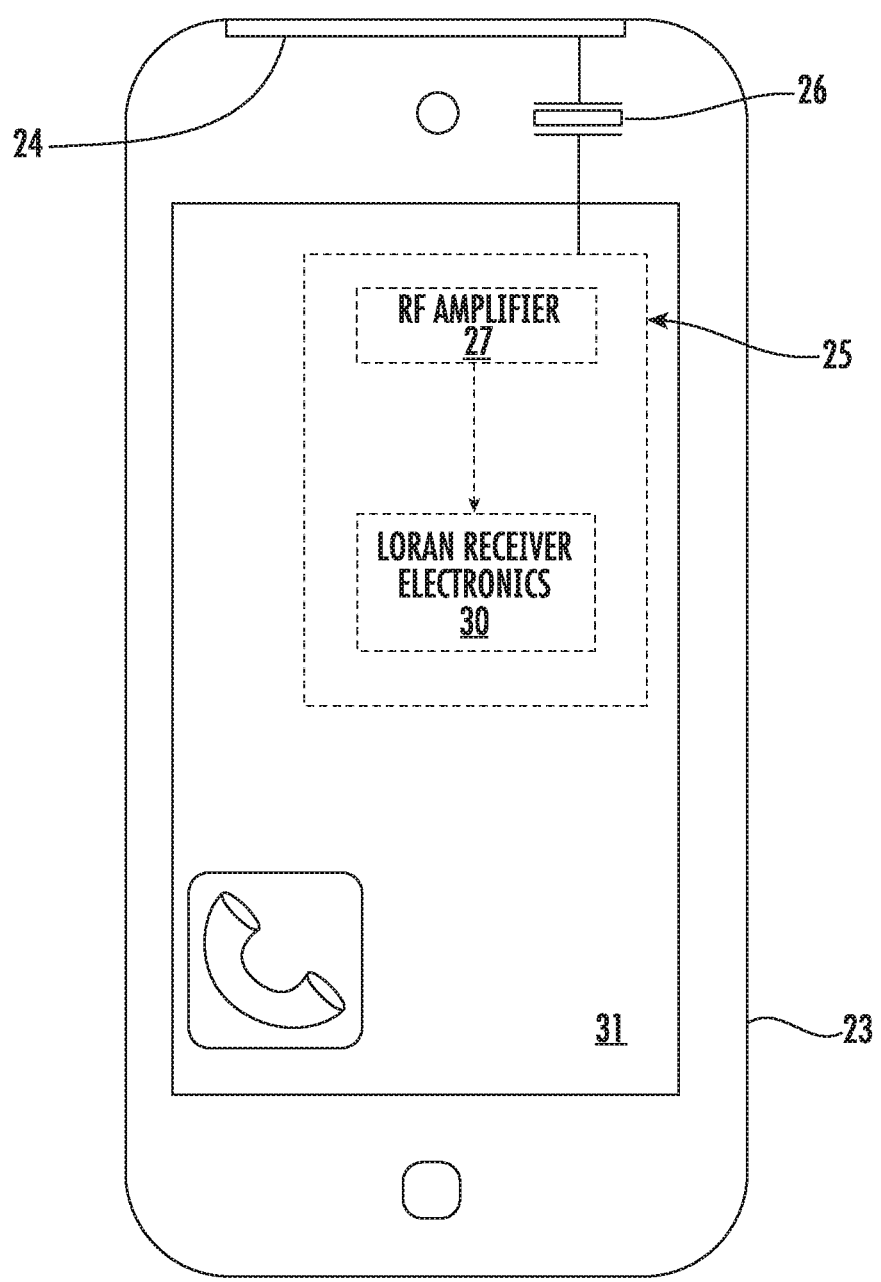
FIG. 2 is a schematic diagram of a LORAN device, according to the present disclosure.

Referring initially to FIGS. 1-2, a LORAN communication system 20, according to the present disclosure, is now described. The LORAN communication system 20 illustratively includes a plurality of LORAN transmitting stations 21a-21c. As will be appreciated, each of the plurality of LORAN transmitting stations 21a-21c is configured to transmit a plurality of LORAN pulses. The LORAN communication system 20 may implement one or more of a plurality of LORAN communication standards, for example, eLORAN, LORAN-A, LORAN-B, and LORAN-C.

The LORAN communication system 20 illustratively includes a LORAN device 22 configured to receive the plurality of LORAN pulses, and use the plurality of LORAN pulses to determine a location of the LORAN device. In particular, as will be appreciated by those skilled in the art, the LORAN device 22 is configured to measure pulse time spacing to determine a latitude and longitude position of the LORAN device 22. In some embodiments, the LORAN device 22 is a receiver only device. It should be appreciated that only one LORAN device 22 is shown for drawing clarity, but the teachings disclosed herein may be applied to one or more of LORAN devices, if not all, in the LORAN communication system 20.

The LORAN device 22 illustratively includes a housing 23, and an electrically short LORAN antenna 24 carried by the housing. As will be appreciated, given the low frequency nature of LORAN communications, and in particular, the plurality of LORAN pulses, the resonant antenna lengths for the antenna are quite long. In the LORAN device 22, the electrically short LORAN antenna 24 has a size and length far below that required for self resonance by itself, as for instance, a half wave dipole receive antenna resonant at 100 kHz frequency is about 1500 meters long, and a quarter wave monopole about 750 meters tall.

Figure 3:
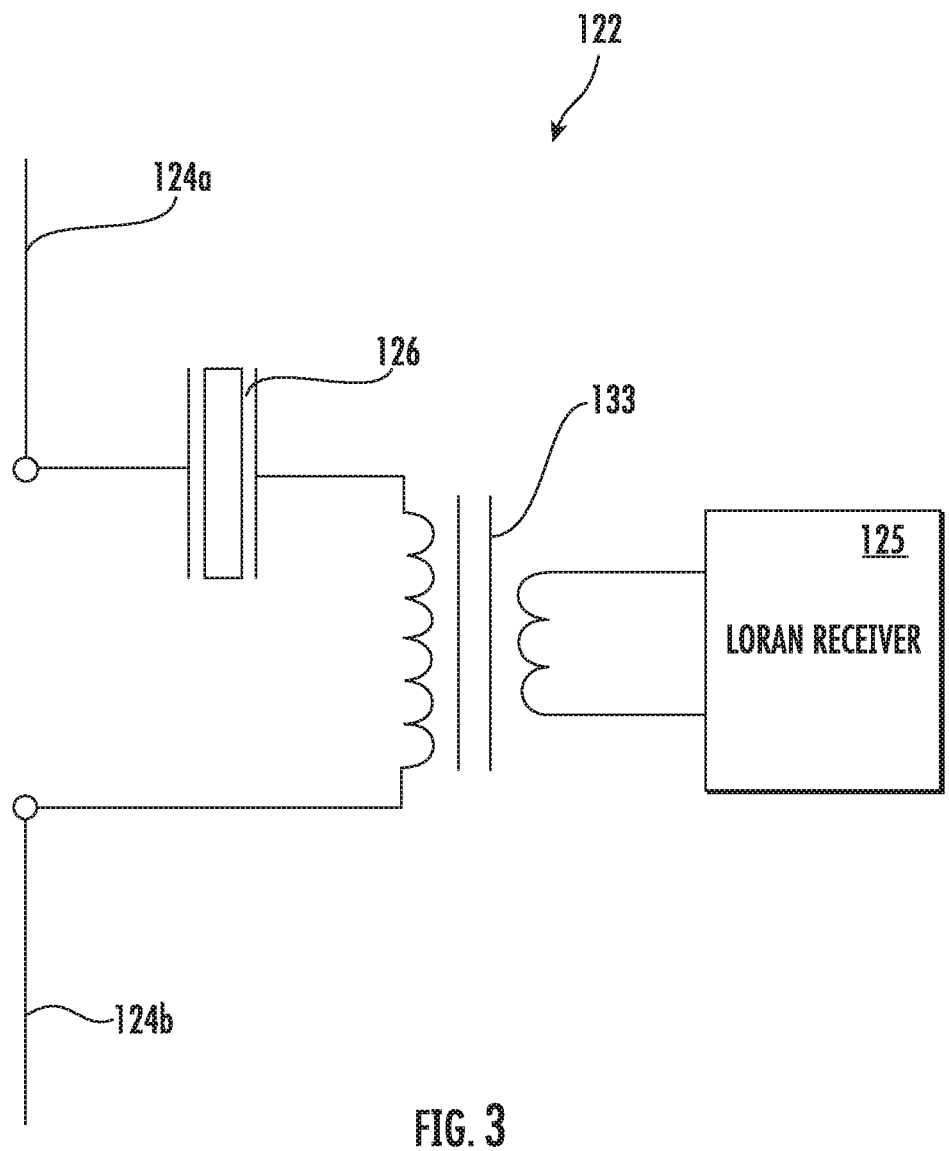
FIG. 3 is a circuit diagram of a LORAN device, according to a first embodiment of the present disclosure.
Figure 4:
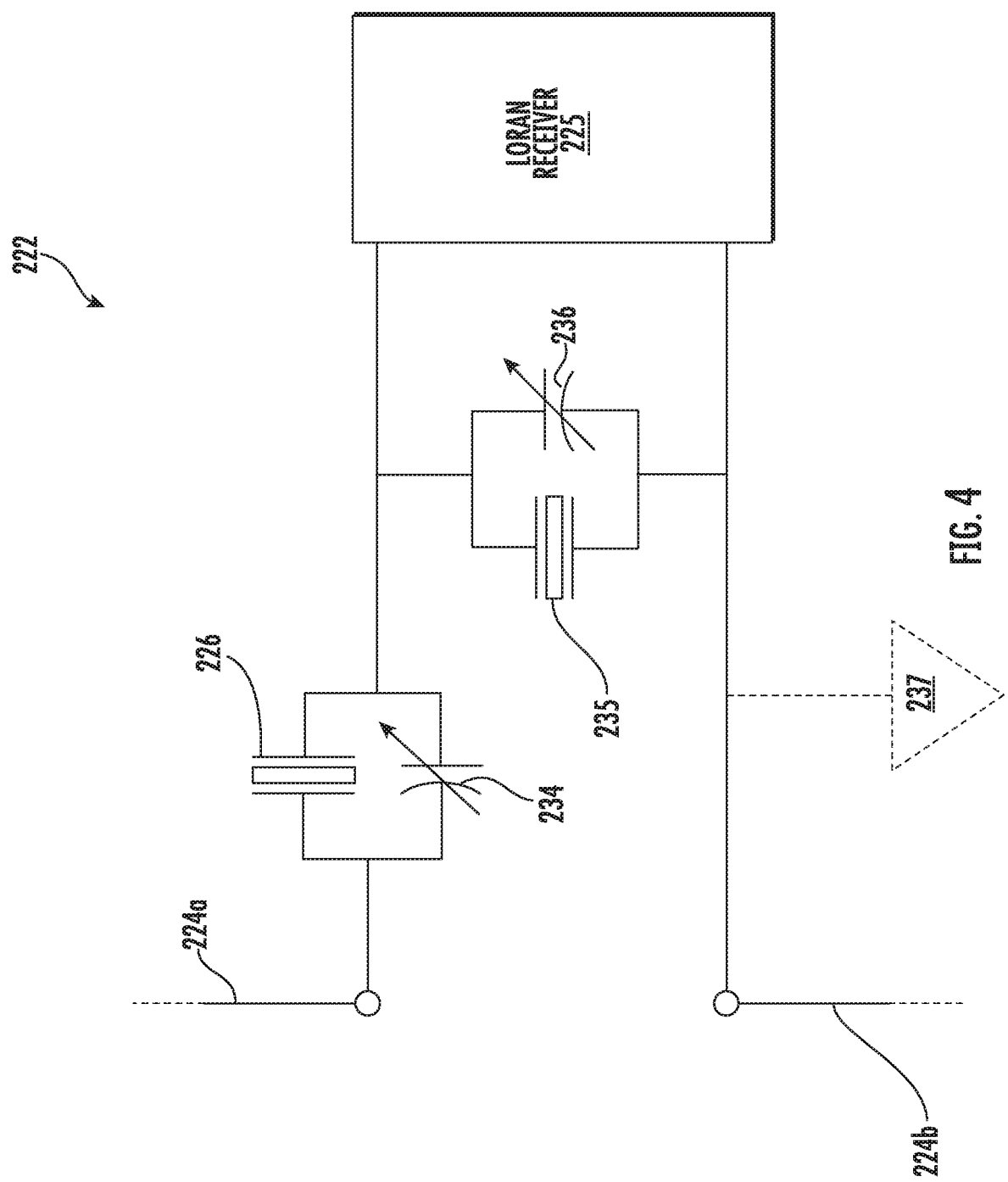
FIG. 4 is a circuit diagram of a LORAN device, according to a second embodiment of the present disclosure.
Figure 5:
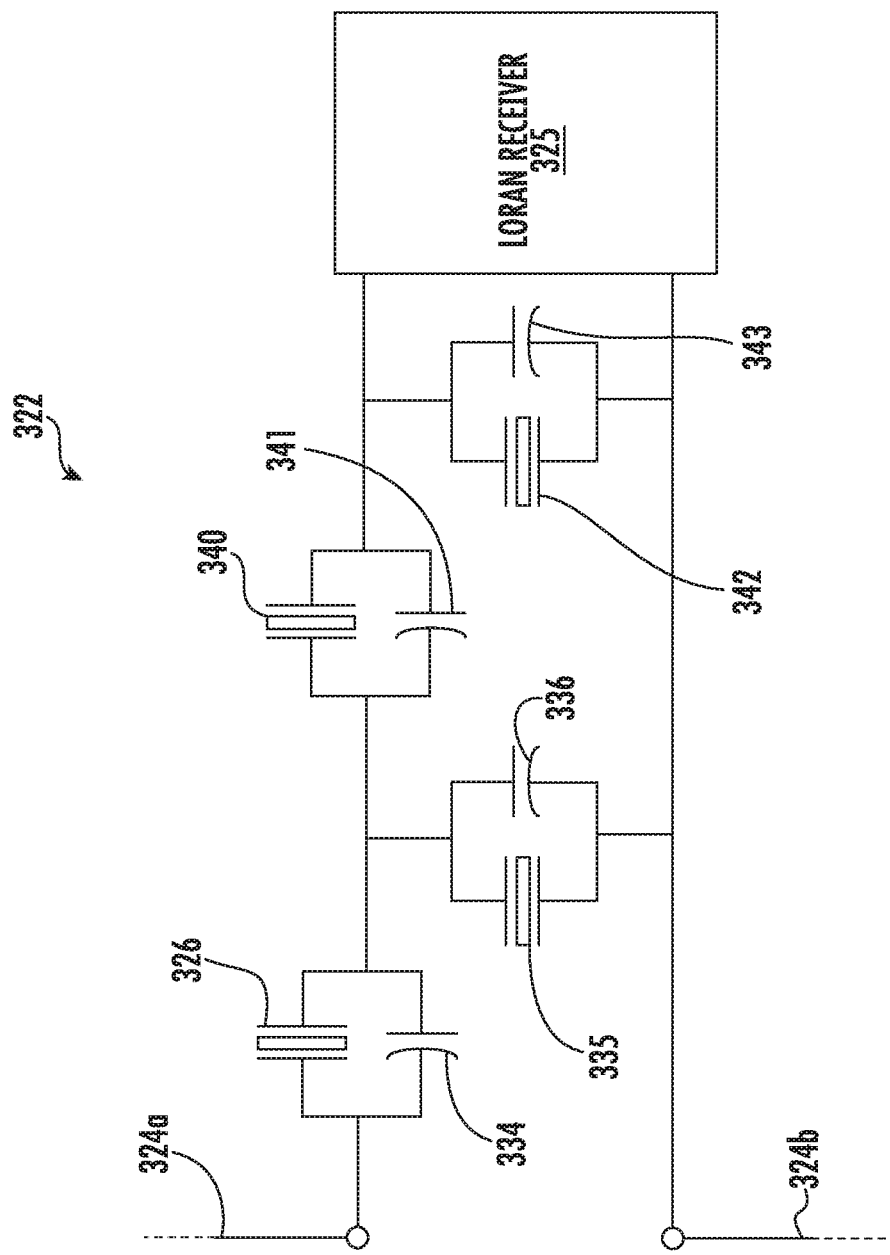
FIG. 5 is a circuit diagram of a LORAN device, according to a third embodiment of the present disclosure.

In some embodiments, the electrically short LORAN antenna 24 comprises a monopole antenna (FIGS. 1-2). In other embodiments, the electrically short LORAN antenna 24 may comprise a dipole antenna (FIGS. 3-5). The electrically short LORAN antenna 24 may comprise a whip antenna or a patch antenna.

In the illustrated embodiment, the electrically short LORAN antenna 24 comprises an electrically floating antenna element. As will be appreciated, the electrically short LORAN antenna 24 is electrically insulated from surrounding components.

More specifically, the electrically floating/insulated from surroundings antenna element is carried by (e.g. embedded in) the housing 23 of the LORAN device 22, which has an exemplary mobile cellular device form factor. Further, the electrically floating antenna element is carried along an uppermost edge of the housing 23. Of course, in other embodiments, the LORAN device 22 may have other form factors that necessitate an electrical short antenna, for example, a portable electronic device (PED), a vehicle platform.

The LORAN device 22 illustratively includes a LORAN receiver 25 carried by the housing 23 and coupled to the electrically short LORAN antenna 24, and an RF crystal resonator 26 coupled to the electrically short LORAN antenna so that the electrically short LORAN antenna is forced to a resonant condition for a LORAN receive signal (i.e. one or more of the plurality of LORAN pulses). In some embodiments, the RF crystal resonator 26 can be replaced with any piezoelectric device.

The RF crystal resonator 26 is configured to act as a loading inductor (providing an inductive reactance) of stable value to force resonate the electrically short LORAN antenna 24 to the LORAN frequency. In some embodiments, the RF crystal resonator 26 may include a quartz crystal resonator, such as a flexural-mode quartz crystal. For example, the RF crystal resonator 26 may provide an inductance in a range of 0.25 to 0.75 Henry. In typical approaches, such high values of inductance may be difficult to accomplish with coils.

Also, the LORAN receiver 25 illustratively includes an RF amplifier 27, and LORAN receiver electronics 30 coupled to the RF amplifier. The LORAN device 22 further comprises a display 31 carried by the housing 23 and coupled to the LORAN receiver 25. In some embodiments, the location of the LORAN device 22 may be presented on the display 31.

The LORAN device 22 illustratively comprises a power source 32 coupled to the LORAN receiver electronics 30 and the display 31. For example, the power source 32 may comprise a battery power source.

Figure 9:
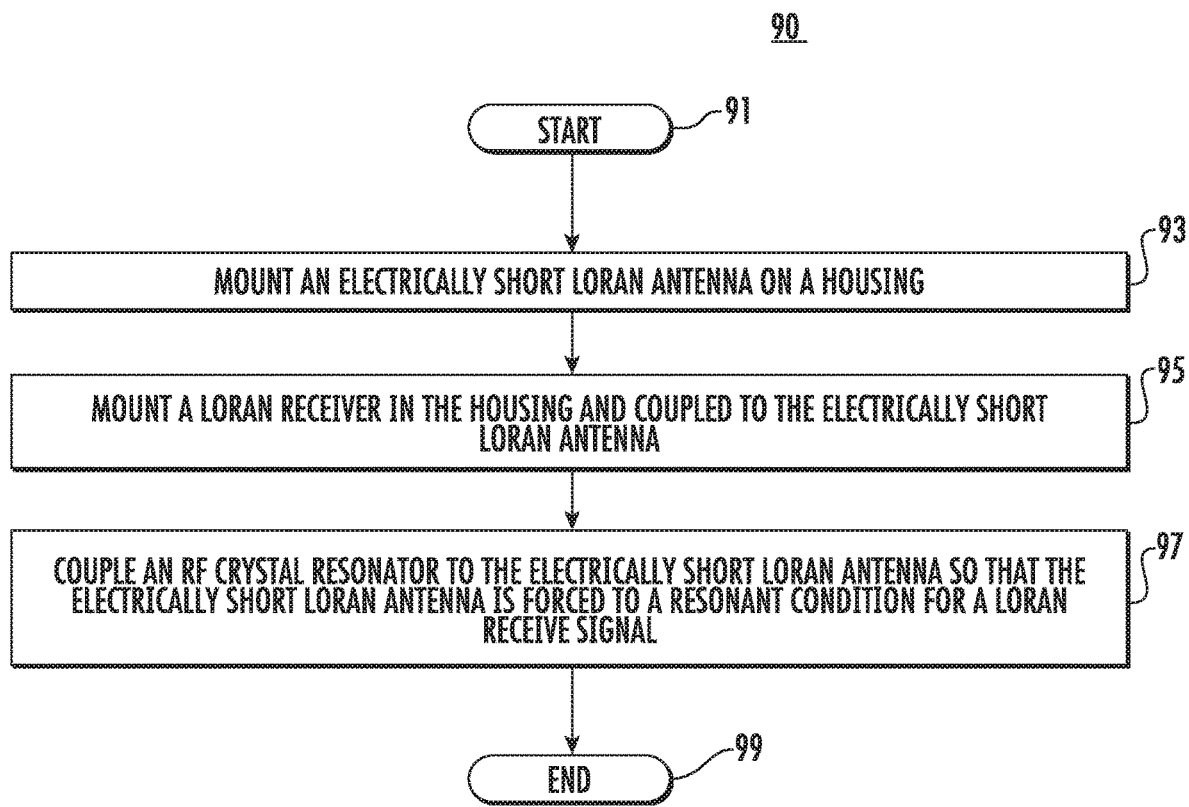
FIG. 9 is a flowchart for a method for making the LORAN device, according to the present disclosure.

Referring now briefly to FIG. 9 and a flowchart 90 therein, a method for making the LORAN device 22 is now described. (Block 91). The method includes mounting an electrically short LORAN antenna 24 on a housing 23 (Block 93), mounting a LORAN receiver 25 in the housing and coupled to the electrically short LORAN antenna (Block 95), and coupling an RF crystal resonator 26 to the electrically short LORAN antenna so that the electrically short LORAN antenna is forced to a resonant condition for a LORAN receive signal. (Blocks 97 & 99).

Referring now additionally to FIG. 3, another embodiment of the LORAN device 122 is now described. In this embodiment of the LORAN device 122, those elements already discussed above with respect to FIGS. 1-2 are incremented by 100 and most require no further discussion herein. This embodiment differs from the previous embodiment in that this LORAN device 122 includes the electrically short LORAN antenna comprising a dipole antenna having a first antenna element 124a and a second antenna element 124b. The LORAN device 122 illustratively comprises a transformer 133 coupled between the RF crystal resonator 126 and the LORAN receiver 125. The transformer 133 cooperates refer the antenna system resistance to an efficient value for the associated receiver and at the same time the RF crystal resonator 126 for forces the antenna conductive structure to resonance.

Referring now additionally to FIG. 4, another embodiment of the LORAN device 222 is now described. In this embodiment of the LORAN device 222, those elements already discussed above with respect to FIGS. 1-2 are incremented by 200 and most require no further discussion herein. This embodiment differs from the previous embodiment in that this LORAN device 222 includes the electrically short LORAN antenna comprising a dipole antenna having a first antenna element 224a and a second antenna element 224b. The first antenna element 224a is electrically floating. As shown with dashed lines, the second antenna element 224b may define a ground plane, being coupled to a reference voltage 237 (e.g. the illustrated chassis ground). Alternatively, the second antenna element 224b is coupled to the LORAN receiver 225

The LORAN device 222 illustratively comprises a first crystal resonator 226 coupled in series with the first antenna element 224a, and a first variable capacitor 234 coupled in parallel with the first crystal resonator. The LORAN device 222 includes a second crystal resonator 235 coupled in parallel with the first antenna element 224a and the second antenna element 224b, and a second variable capacitor 236 coupled in parallel with the second crystal resonator.

The first variable capacitor 234 and the second variable capacitor 236 are configured to respectively tune the first crystal resonator 226 and the second crystal resonator 235 for adjusting inductance. Helpfully, this can address temperature drift in the first crystal resonator 226 and the second crystal resonator 235. By adding the second crystal resonator 235, the LORAN device 222 may adjust antenna resistance to a value near 50 Ohms, which is common for RF circuits.

In some embodiments, the first crystal resonator 226 and the second crystal resonator 235 are identical. In other embodiments, the first crystal resonator 226 and the second crystal resonator 235 are different. Also, the ratio of the capacitances of the first variable capacitor 234 and the second variable capacitor 236 sets resistance of the receive path (e.g. 50 Ohms). Also, the sum of the capacitances of the first variable capacitor 234 and the second variable capacitor 236 sets antenna frequency.

Figure 6:
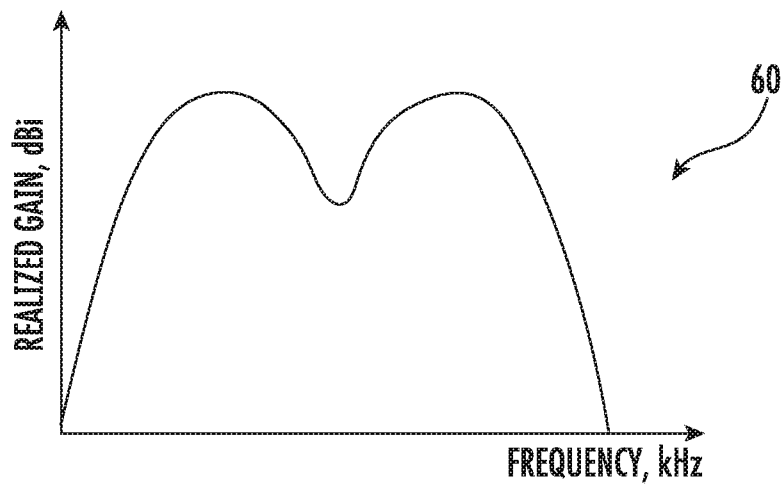
FIG. 6 is a diagram of gain in the LORAN device of FIG. 5.

Referring now additionally to FIGS. 5 and 6, another embodiment of the LORAN device 322 is now described. In this embodiment of the LORAN device 322, those elements already discussed above with respect to FIGS. 1-2 are incremented by 300 and most require no further discussion herein. This embodiment differs from the previous embodiment in that this LORAN device 322 includes the electrically short LORAN antenna comprising a dipole antenna having a first antenna element 324a and a second antenna element 324b. The first antenna element 324a is electrically floating, and the second antenna element 324b is coupled to the LORAN receiver 325.

The LORAN device 322 illustratively comprises a first crystal resonator 326 coupled in series with the first antenna element 324a, and a first capacitor 334 coupled in parallel with the first crystal resonator. The LORAN device 322 includes a second crystal resonator 335 coupled in parallel with the first antenna element 324a and the second antenna element 324b, and a second capacitor 336 coupled in parallel with the second crystal resonator.

The LORAN device 322 illustratively comprises a third crystal resonator 340 coupled in series with the first antenna element 324a, and a third capacitor 341 coupled in parallel with the third crystal resonator. The LORAN device 322 includes a fourth crystal resonator 342 coupled in parallel with the first antenna element 324a and the second antenna element 324b, and a fourth capacitor 343 coupled in parallel with the fourth crystal resonator.

In other words, this LORAN device 322 employs a lattice network of crystal resonators for allowing controlled frequency response to a specified ripple amplitude. A diagram 60 illustrates a gain profile for the LORAN device 322. The gain profile includes a 4th order Chebyshev frequency response. In some embodiments, the LORAN device 322 may comprise more than the illustrated four crystal resonators 326, 335, 340, 342. Helpfully, the inclusion of more crystal resonators may provide for greater efficiency and bandwidth, as is known from filter theory.

Figure 7:
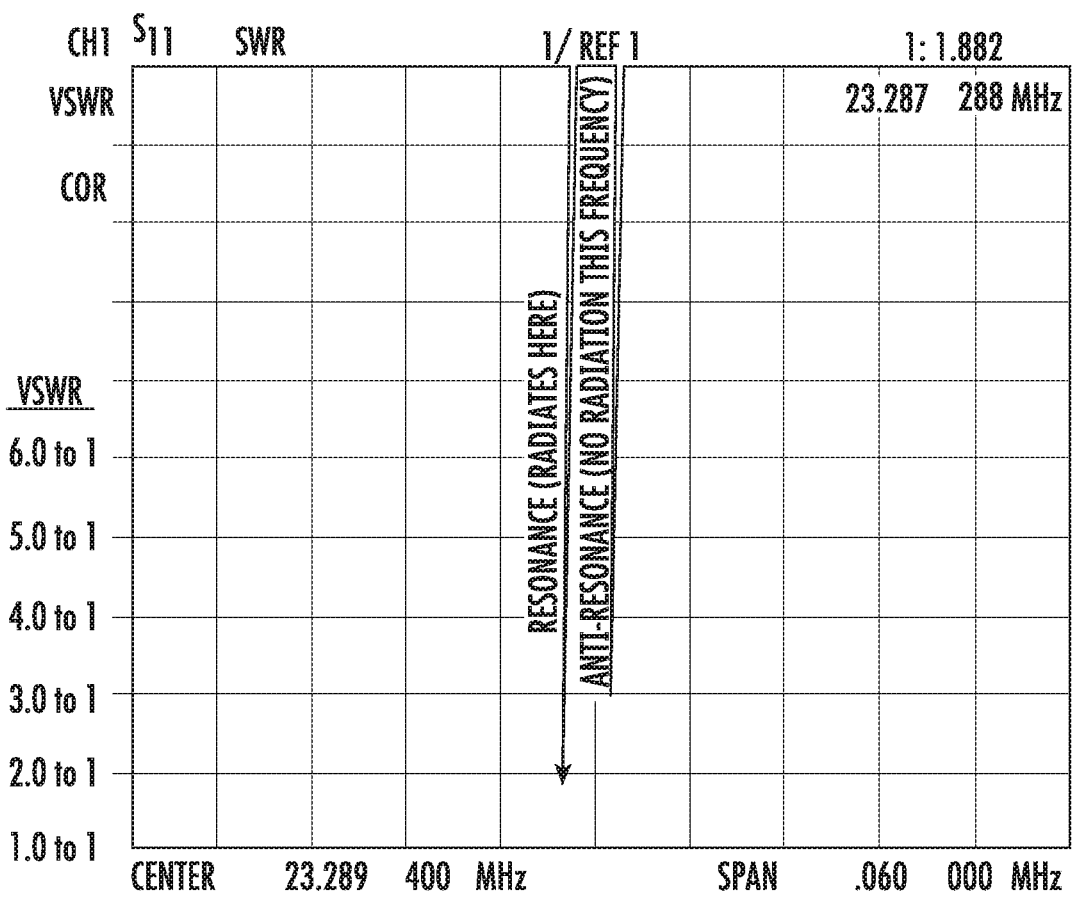
FIG. 7 is a diagram of Voltage Standing Wave Ratio (VSWR) in the LORAN device of FIG. 4.
Figure 8:
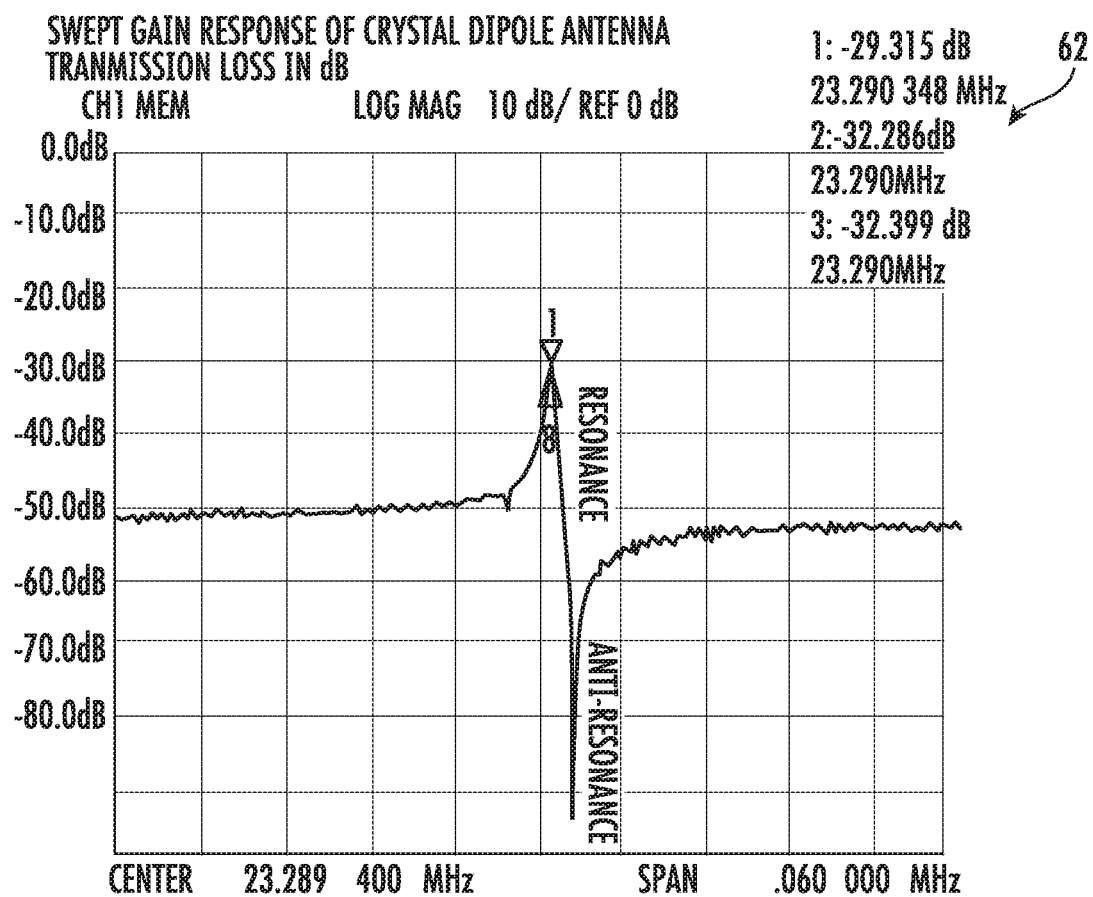
FIG. 8 is a diagram of swept gain response in the LORAN device of FIG. 4.

Referring now to FIGS. 7 and 8, diagrams 61 and 62 respectively show VSWR and swept gain response for an exemplary implementation of the LORAN device 222. For this simulation, the first antenna element 224a and the second antenna element 224b each comprise a 10-inch long wire of 18 gauge (American wire gauge) electrical conductor. The first variable capacitor 234 and the second variable capacitor 236 each has a capacitance value of 7-40 pF. Each of the first crystal resonator 226 and the second crystal resonator 235 comprises 69.545 MHz resonators. As evident, the simulation shows resonance at 23.287288 MHz with a 1.9/1 VSWR. Diagram 62 shows resonance (i.e. peak gain) at 23.290348 MHz.

The radiation pattern of the electrically short LORAN antenna 24 is a sine function (3D toroid shape) similar to that provided by a half wave dipole. For a vertically held eLoran receiver, the polarization is vertical. The 3 dB beamwidth is about 85 degrees. Realized gain is a function of the electrically short LORAN antenna 24 element size and the Q of the RF crystal resonator 26. Radiation efficiency η is given by $\eta = r_r/(r_r+r_c)$, where $r_r$=the antenna radiation resistance and re is the equivalent series resistance or loss resistance of the quartz resonator. The short LORAN antenna 24 antenna metal conductor losses may typically be ignored. Since the directivity of a small antenna is between 0 and 1.5 fundamentally, and more typically 1.5, the realized gain G is then $G = 10 \text{ LOG}_{10} (1.5\eta)$ dBi.3

At the low frequencies typical for eLoran, such as 100 kHz, atmospheric noise levels are high from lightning emissions, electron gyroresonance in the ionosphere and other natural sources. As well, manmade interference may also be present from powerline conductors and switching power supplies nearby. To this reality, worldwide levels of noise and interference are described in the publication "Recommendation ITU-R P.372-13 (August 2016) Radio Noise" by the International Telecommunications Union, Geneva Switzerland. FIG. 3 "$F_a$ Versus Frequency" of this document indicates that those atmospheric noise and manmade interference levels vary between 75 and 140 decibels greater amplitude than the thermal noise in a 100 kHz receive antenna at room temperature. Given that the directivity D of an electrically small antennas is small (0 dBi<D<1.76 dBi), this report indicates that the realized gains required for electrically small antennas to overcome antenna thermal noise at 100 kHz vary between −73 and −140 dBi depending on season and earth location. Tests on prototypes of the electrically short LORAN antennas 24 have in all prototypes been sufficient to resolve to atmospheric noise at 100 kHz operating frequency in remote areas test environments free from man-made interference in the United States winter. In other words, the electrically short LORAN antennas 24 is sensitive enough to where no more sensitivity is needed for the eLoran purpose intended as there is exceptional sensitivity and gain for size.

A theory of operation will now be described. The shape of the antenna 24 element can be many because the antenna 24 is small relative wavelength, a condition that means that antenna radiation pattern is somewhat insensitive to antenna shape in most instances the radiation pattern of the antenna 24 will be a toroid although an array of antennas 24 is also contemplated to approximate a spherical pattern. A dipole, monopole, whip, patch or other antenna 24 element not having a closed electric circuit is contemplated so the needed loading reactance for force the electrically small antenna 24 element to the RF operating frequency is an inductive loading reactance. The operating frequency of the RF crystal resonator 26, such as, for example, a quartz crystal resonator 26, may advantageously be in the inductive reactance region of the RF crystal resonator 26 circuit impedance curve, a region which is typically between the quartz crystals series and parallel resonance frequencies. So, for inductive loading of an electrically short monopole antenna 24 the RF receive frequency may be just below the RF crystal resonator 24 parallel resonant frequency. So, the resonant frequency of the RF crystal resonator 26 and the RF receive frequency can be slightly different.

As for antenna 24 efficiency and realized gain. Prior art electrically small antenna elements having an open electrical circuit, such as a dipole, monopole, whip, of patch antenna 24 element, are frequently loaded to resonance by the use of a coil inductor. However, the Q factor of a quartz crystal can approach 100,000 and the Q factor of a copper coil inductor may be say 100, so the equivalent series resistance or loss resistance of the quartz crystal resonator 26 can be 1000 times less than that of a copper coil loading inductor. Thus, the RF crystal resonator 26 provides a more efficient form of electrically small antenna loading and force resonating than is available with prior art copper coils. The RF crystal resonator may be much smaller than a copper coil. Given the stability of a quartz crystal the corresponding stability of the antenna tuning is exceptional.

In typical approaches, the application of small dipoles may require loading inductors to force resonance. A potential drawback to this approach is that the metal material in the loading inductor makes it lossy. Moreover, these approaches may provide for low gain results, insensitive receivers, and or excessive product size.

The LORAN devices 22, 122, 222, 322 disclosed herein provide an approach to deploying LORAN devices in small form factor mobile devices. In other words, in applications where the LORAN antenna is necessarily electrically short. Moreover, the LORAN devices 22, 122, 222, 322 may provide LORAN antenna tuning, and stronger reception performance. In particular, the crystal resonators appear as inductors to the LORAN signal, and permit replacement of the bulky inductors in typical approaches. For instance, coil inductors of the required inductance may range to ½ henry in value and are therefore undesireable from a cost and size standpoint.

Other features relating to communication systems are disclosed in co-pending U.S. patent application Ser. No. 15/980,857 Filed on May 16, 2018, which is incorporated herein by reference in its entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A LOng RAnge Navigation (LORAN) device comprising:
   a housing;
   an electrically short LORAN antenna carried by the housing and comprising a dipole having first and second antenna elements;
   a LORAN receiver carried by the housing and coupled to the electrically short LORAN antenna; and
   a first radio frequency (RF) crystal resonator coupled in series with one of the first and second antenna elements and a second RF crystal resonator coupled in parallel with the first and second antenna elements so that the electrically short LORAN antenna is forced to a resonant condition for a LORAN receive signal.

2. The LORAN device according to claim 1 wherein at least one of the first and second RF crystal resonators comprises a quartz crystal resonator.

3. The LORAN device according to claim 1 wherein the electrically short LORAN antenna comprises an electrically floating antenna element.

4. The LORAN device according to claim 1 wherein the first antenna element is electrically floating and the second antenna element defines a ground plane.

5. The LORAN device according to claim 1 wherein at least one of the first and second RF crystal resonators provides an inductance in a range of 0.25 to 0.75 Henry.

6. The LORAN device according to claim 1 wherein the LORAN receiver comprises an RF amplifier, and LORAN receiver electronics coupled to the RF amplifier.

7. The LORAN device according to claim 1 further comprising a display carried by the housing and coupled to the LORAN receiver.

8. The LORAN device according to claim 1 wherein the LORAN device comprises an enhanced LORAN (eLORAN) device.

9. A LOng RAnge Navigation (LORAN) device comprising:
- a housing;
- an electrically short LORAN antenna carried by the housing and comprising a first antenna element being electrically floating and a second antenna element defining a ground plane;
- a LORAN receiver carried by the housing;
- a first radio frequency (RF) quartz crystal resonator coupled in series between the first antenna element and the LORAN receiver; and
- a second RF quartz crystal resonator coupled in parallel with the first antenna element and the second antenna element.

10. The LORAN device according to claim 9 wherein at least one of the first and second RF quartz crystal resonators provides an inductance in a range of 0.25 to 0.75 Henry.

11. The LORAN device according to claim 9 wherein the LORAN receiver comprises an RF amplifier, and LORAN receiver electronics coupled to the RF amplifier; and further comprising a display carried by the housing and coupled to the LORAN receiver.

12. The LORAN device according to claim 9 wherein the LORAN device comprises an enhanced LORAN (eLORAN) device.

13. A method for making a LOng RAnge Navigation (LORAN) device comprising:
- mounting an electrically short LORAN antenna on a housing and comprising a dipole having first and second antenna elements;
- mounting a LORAN receiver in the housing and coupled to the electrically short LORAN antenna; and
- coupling a first radio frequency (RF) crystal resonator in series with one of the first and second antenna elements and a second RF crystal resonator in parallel with the first and second antenna elements so that the electrically short LORAN antenna is forced to a resonant condition for a LORAN receive signal.

14. The method according to claim 13 wherein at least one of the first and second RF crystal resonators comprises a quartz crystal resonator.

15. The method according to claim 13 wherein the electrically short LORAN antenna comprises an electrically floating antenna element.

16. The method according to claim 13 wherein the first antenna element is electrically floating and the second antenna element defines a ground plane.

17. The method according to claim 13 wherein the LORAN device comprises an enhanced LORAN (eLORAN) device.

* * * * *